United States Patent
Moeneclaey et al.

(10) Patent No.: US 12,453,185 B2
(45) Date of Patent: Oct. 21, 2025

(54) PROTECTION OF A DOMAIN OF AN INTEGRATED CIRCUIT AGAINST OVERVOLTAGES

(71) Applicants: STMicroelectronics (Grenoble 2) SAS, Grenoble (FR); STMicroelectronics (Alps) SAS, Grenoble (FR)

(72) Inventors: Nicolas Moeneclaey, Vourey (FR); Jean-Luc Patry, Crolles (FR)

(73) Assignees: STMicroelectronics (Alps) SAS, Grenoble (FR); STMicroelectronics (Grenoble 2) SAS, Grenoble (FR)

( * ) Notice: Subject to any disclaimer, the term of this patent is extended or adjusted under 35 U.S.C. 154(b) by 450 days.

(21) Appl. No.: 17/969,867

(22) Filed: Oct. 20, 2022

(65) Prior Publication Data
US 2023/0154919 A1    May 18, 2023

(30) Foreign Application Priority Data

Nov. 18, 2021  (FR) ...................... 2112211

(51) Int. Cl.
*H10D 89/60* (2025.01)
(52) U.S. Cl.
CPC ......... *H10D 89/611* (2025.01); *H10D 89/713* (2025.01); *H10D 89/911* (2025.01)
(58) Field of Classification Search
CPC .. H10D 89/611; H10D 89/713; H10D 89/911; H10D 89/811; H02H 9/041; H02H 9/046; H02H 7/20; H02H 9/02
USPC .......................................................... 361/56
See application file for complete search history.

(56) References Cited

U.S. PATENT DOCUMENTS

| | | | |
|---|---|---|---|
| 5,463,520 A * | 10/1995 | Nelson ................... | H02H 9/046 361/56 |
| 6,388,850 B1 * | 5/2002 | Ker ......................... | H02H 9/046 361/56 |
| 6,501,632 B1 * | 12/2002 | Avery ..................... | H02H 9/046 361/111 |
| 6,762,647 B1 * | 7/2004 | Apel ....................... | H03F 1/52 330/285 |

(Continued)

FOREIGN PATENT DOCUMENTS

JP    H05121679 A  *  5/1993
KR    20080062530 A    7/2008

*Primary Examiner* — Dharti H Patel
(74) *Attorney, Agent, or Firm* — Slater Matsil, LLP

(57) ABSTRACT

In embodiments, an integrated circuit is provided that includes an input/output cell having a first signal terminal and a second signal terminal connected to a domain and capable of withstanding a maximum voltage greater than the power supply voltage. The input/output cell further includes an array of N diodes coupled in series between the second signal terminal and a cold power supply point. The array has an overall threshold voltage greater than the maximum voltage. The integrated circuit further includes a control circuit connected between the first signal terminal and the array of diodes. The control circuit is configured, in the presence of a second voltage on the first signal terminal greater than the maximum voltage, to automatically and autonomously short-circuit at least one of the diodes in the array to limit the voltage on the second signal terminal to a third voltage less than the maximum voltage.

20 Claims, 2 Drawing Sheets

(56) References Cited

U.S. PATENT DOCUMENTS

| | | | | |
|---|---|---|---|---|
| 7,593,204 B1* | 9/2009 | Iversen | .................. | H02H 9/046 |
| | | | | 361/56 |
| 7,839,612 B1* | 11/2010 | Chan | .................. | H10D 89/819 |
| | | | | 361/56 |
| 7,929,264 B2* | 4/2011 | Kim | .................... | H10D 89/819 |
| | | | | 361/111 |
| 8,054,596 B2* | 11/2011 | Koyama | .............. | H10D 89/601 |
| | | | | 361/118 |
| 9,673,116 B2* | 6/2017 | DeForge | ................ | H01L 22/34 |
| 11,508,719 B2* | 11/2022 | Ting | ....................... | H10D 64/62 |
| 2003/0128486 A1* | 7/2003 | Chuang | ............... | H10D 89/815 |
| | | | | 361/56 |
| 2004/0141270 A1* | 7/2004 | Kaneki | ............... | H10D 89/611 |
| | | | | 361/56 |
| 2008/0123230 A1* | 5/2008 | Yun | ....................... | H02H 9/046 |
| | | | | 361/56 |
| 2008/0198517 A1* | 8/2008 | Son | ....................... | H02H 9/046 |
| | | | | 361/56 |
| 2010/0302693 A1* | 12/2010 | Hayashi | ............... | H10D 89/601 |
| | | | | 361/56 |
| 2011/0304940 A1 | 12/2011 | Cao et al. | | |
| 2012/0112286 A1 | 5/2012 | Pok et al. | | |
| 2016/0071836 A1* | 3/2016 | Tsai | .................... | H10D 89/819 |
| | | | | 361/56 |
| 2016/0336308 A1* | 11/2016 | Esmark | ................ | H10D 89/611 |
| 2023/0154919 A1* | 5/2023 | Moeneclaey | .......... | H02H 9/046 |
| | | | | 257/355 |

* cited by examiner

[Fig 1]
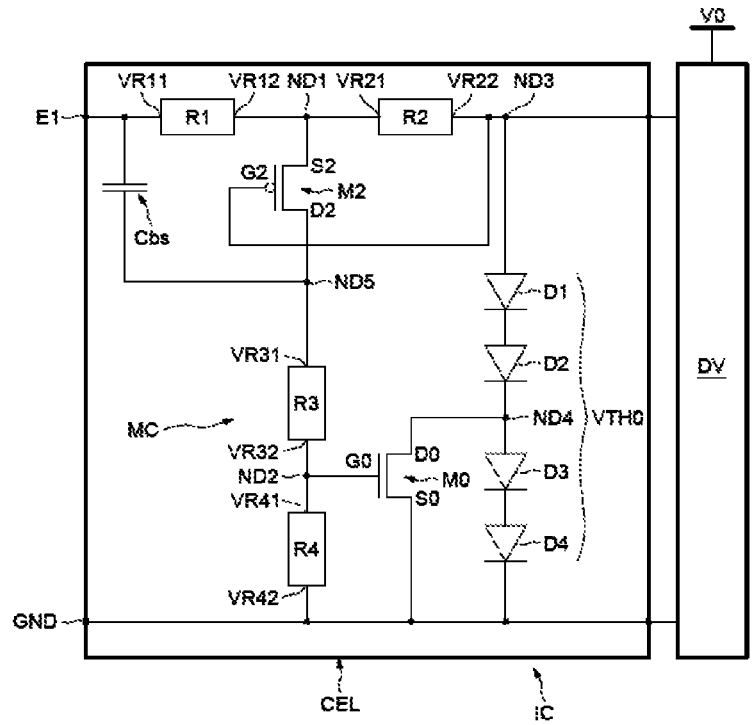
[Fig 2]
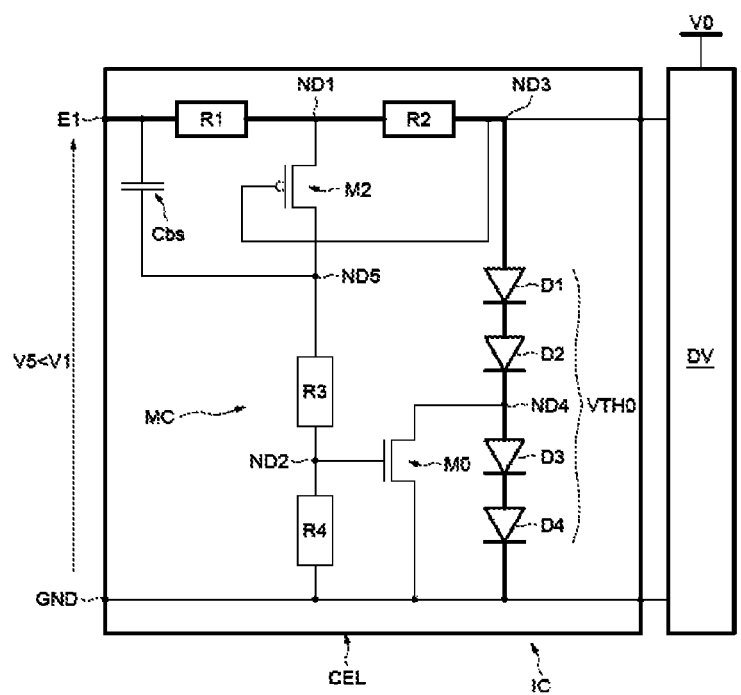

[Fig 3]
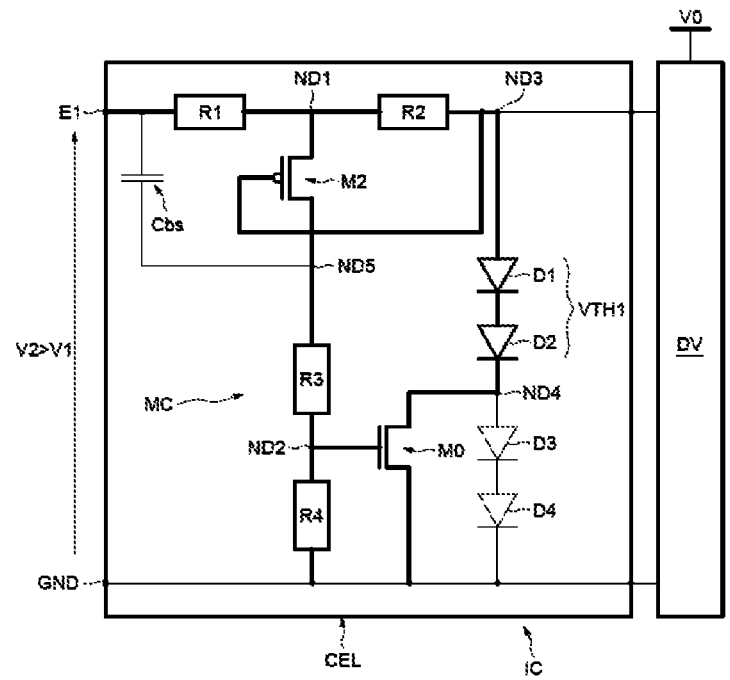
[Fig 4]
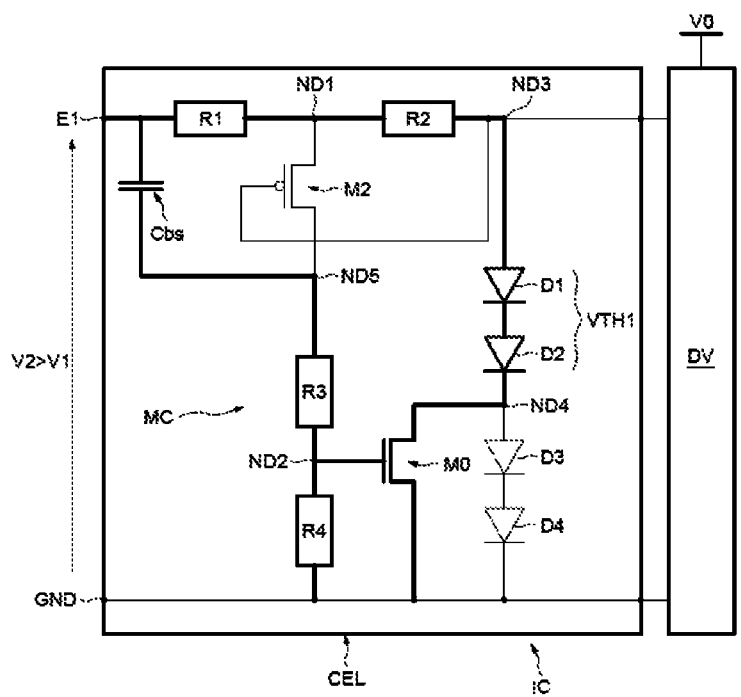

PROTECTION OF A DOMAIN OF AN INTEGRATED CIRCUIT AGAINST OVERVOLTAGES

CROSS-REFERENCE TO RELATED APPLICATIONS

This application claims priority to French Application No. 2112211, filed on Nov. 18, 2021, which application is hereby incorporated by reference herein in its entirety.

TECHNICAL FIELD

The present disclosure generally relates to integrated circuits, and in particular embodiments, to the protection of a domain of the integrated circuit against overvoltages.

BACKGROUND

Integrated circuits such as microcontrollers generally provide input/output cells allowing the routing of signals between the exterior of the integrated circuit and one or more domains internal to the integrated circuit. A domain of the integrated circuit can be designed to operate under a first voltage but withstand a second maximum voltage greater than the first. However, it is possible that the input/output cell connected to this domain is subjected at least temporarily to a third voltage greater than the second voltage. There is, therefore, a need to protect the domain as effectively as possible against these overvoltages.

Moreover, some integrated circuits may provide a high-speed input/output ("High speed I/O") cell to allow high-speed communication between the outside and the domain. More particularly, this type of input/output cell must, for example, be capable of routing high-frequency signals, of the order of 12 MHz, for example, from a domain of the integrated circuit or towards this domain. There is, therefore, also a need to propose a solution allowing to protect this domain against overvoltages without, however, restricting the transmission of high-frequency signals to or from this domain in operation.

SUMMARY

According to one aspect, provision is made in this regard of an integrated circuit including at least one input/output cell having a first signal terminal for receiving/transmitting a signal and having a second signal terminal connected to a domain configured to operate under a power supply voltage V0, for example, 1.8 volts, and capable of withstanding a maximum voltage V1, for example, 3.6 volts, greater than V0.

The input/output cell includes an array of N diodes, for example, four diodes, connected in series between the second signal terminal and a cold power supply point, typically ground, the array having an overall threshold voltage greater than V1.

This overall threshold voltage is equal to N times the effective threshold voltage of a diode, this effective threshold voltage taking into account that the diode includes an access resistor. For example, the effective threshold voltage of a "real" diode can be, for example, of the order of 1.1 volts, while the theoretical threshold voltage of an "ideal" diode (without access resistance) is typically of the order of 0.7 volts.

The input/output cell also includes a control circuit connected between the first signal terminal and the array of diodes, and configured, in the presence of a voltage V2, for example, 5 volts or more, on the first signal terminal greater than the voltage V1, to automatically and autonomously short-circuit at least one of the diodes to limit the voltage on the second signal terminal to a value V3 less than V1.

"Control circuit configured to automatically and autonomously short-circuit at least one of the diodes" means that the short-circuit of at least one of the diodes of the diode array is performed without the intervention of an activation signal of these control circuit from a circuit external to these control circuit even if the input/output cell is not power supplied, which also allows to ensure protection against electrostatic discharges (ESD: Electro Static Discharge). The activation of the short-circuit mechanism is advantageously only conditioned by the presence of the voltage V2 on the first signal terminal. Consequently, the value of the voltage V3 can be determined from the sum of the effective threshold voltages of the diodes not short-circuited by the control circuit.

According to one embodiment, the number N is chosen to limit current leaks between the second signal terminal and the cold power supply point below a threshold, for example, 10 nA, during the operation of the domain.

Thus, for example, the number of diodes must not be too low to sufficiently limit the leakage current of the domain of the integrated circuit during its operation.

The person skilled in the art will know how to choose the number N according to the features of the considered domain of the integrated circuit.

According to one embodiment, the control circuit includes a first resistor connected between the first signal terminal and the second signal terminal, a first PMOS transistor, the source and the gate of which are respectively connected to the two terminals of the first resistor and a second NMOS transistor, the gate of which is connected to the drain of the first transistor, the source of which is connected to the cold power supply point by a second resistor, and the drain of which is connected to a node of the diode array located between two consecutive diodes.

The first resistor allows having, in the presence of the voltage V2 on the first signal terminal, a potential difference at these terminals leading to a negative source gate voltage of the first PMOS transistor to turn on this first transistor and have a positive source gate voltage for the second NMOS transistor to turn it on and short-circuit the desired number of diodes.

The person skilled in the art will be able to choose the value of the first resistor to obtain, in the presence of the voltage V2, a source gate voltage of the first PMOS transistor greater in absolute value than the threshold voltage of the first transistor.

Furthermore, using MOS transistors and resistors allows simply achieving the control circuit.

According to one embodiment, the control circuit further includes a third resistor connected between the first resistor and the first signal terminal, the source of the first transistor being connected to the node common to the first resistor and the second resistor.

Adding a third resistor in the control circuit reduces the voltage between the gate and the source of the first transistor thanks to a "divider bridge" type assembly, which protects the first transistor, in particular for high voltage values V2.

According to one embodiment, the control circuit includes a fourth resistor connected between the drain of the first transistor and the third resistor, the gate of the second transistor being connected to the node common to the third resistor and the fourth resistor.

The addition of a fourth resistor in the control circuit reduces the voltage between the gate and the source of the second transistor thanks to a "divider bridge" type assembly which also allows protection of the second transistor, in particular for high voltage values V2.

According to one embodiment, the input/output cell further includes a capacitor connected between the first signal terminal and the gate of the second NMOS transistor.

It is possible to observe sudden variations in voltage V2 on the first signal terminal and an exceeding of the maximum voltage value V1, which is fast enough not to trigger the short-circuit mechanism quickly enough. The capacitor then allows a voltage to be applied to the gate of the second transistor from the voltage V2 present on the first signal terminal to activate the short-circuit mechanism very quickly.

However, this capacitor forms with the first resistor and, optionally, the third resistor, an RC filter. The person skilled in the art will know how to choose the capacitive value of the capacitor so as not to disturb the transmission of high-speed and high-frequency signals.

According to another aspect, provision is made of a method for protecting at least one domain of an integrated circuit against overvoltages, wherein the domain operates under a power supply voltage V0, and can withstand a maximum voltage V1 greater than V0, and receives/transmits a signal via a first signal terminal of an input/output cell.

An array of N diodes is connected in series inside the cell, between a second signal terminal connected to the domain and a cold power supply point, the array having an overall threshold voltage greater than V1, and in the presence of a voltage V2 on the first signal terminal greater than the voltage V1, the cell itself automatically and autonomously short-circuits at least one of the diodes to limit the voltage on the second signal terminal to a value V3 less than V1.

According to one embodiment, the number N is chosen to limit the current leaks between the second signal terminal and the cold power supply point below a threshold during the operation of the domain.

BRIEF DESCRIPTION OF THE DRAWINGS

For a more complete understanding of the present disclosure and the advantages thereof, reference is now made to the following descriptions taken in conjunction with the accompanying drawings, in which:

FIGS. 1-4 are diagrams of an embodiment integrated circuit.

DETAILED DESCRIPTION OF ILLUSTRATIVE EMBODIMENTS

FIG. 1 illustrates an integrated circuit IC, for example, a microcontroller that includes several input/output cells of which only one referenced CEL is shown for the brevity of discussion. This cell CEL is connected to a domain DV of the integrated circuit IC. The input/output cell CEL includes a first signal terminal E1, a third signal terminal ND3, and a diode array.

The first signal terminal E1 is used to receive a signal from outside the circuit IC or to transmit a signal from the input/output cell CEL. This signal may be a square signal or a sinusoidal signal, for example, having a defined frequency, for example, 12 MHz. The voltage V2 of this signal is therefore applied between the first signal terminal E1 and a cold power supply point GND. The third signal terminal ND3 is connected to the domain DV configured here to operate at a power supply voltage V0, for example, 1.8 volts.

However, the domain DV is here capable of withstanding a maximum voltage V1, for example, 3.6 volts, greater than V0.

The diode array may include N diodes, for example, four diodes D1, D2, D3, and D4 connected in series between the third signal terminal ND3 and a cold power supply point GND, typically ground, of the cell CEL.

The choice of the number N of diodes may depend on the parameters of the circuit during the operation of the domain DV and will therefore be detailed subsequently during the description of FIG. 2.

The diode array has an overall threshold voltage VTH0 greater than V1, which is here equal to 4 (N=4) times the effective threshold voltage of a diode. The effective threshold voltage takes into account the fact that a diode includes an access resistor (not shown in the figure) and therefore corresponds to the "real" threshold voltage of the diode. The "real" threshold voltage may, for example, be of the order of 1.1 volts, while the theoretical threshold voltage of a diode, that is to say, without access resistance, is typically around 0.7 volts. The overall threshold voltage VTH0 of the diode array can then be worth, in practice, 4.4 volts instead of 2.8 volts in theory.

The input/output cell CEL further includes a control circuit MC connected between the first signal terminal E1 and the diode array. The control circuit MC includes, in this embodiment, a second resistor R2 and a second PMOS transistor M2. The second resistor R2 is indirectly connected between the first signal terminal E1 and the third signal terminal ND3.

In embodiments, the second resistor R2 has a terminal VR21 and a terminal VR22 connected to the third signal terminal ND3. The source S2 and the gate G2 of the second transistor M2 are respectively connected to the terminals VR21 and VR22 of the second resistor R2.

The voltage Vgs2 between the gate G2 and the source S2 of the second transistor M2 is equal to the potential difference at the terminals of the second resistor R2. Depending on the voltage present at the first signal terminal E1 and the value of the resistor R2, the source gate voltage Vgs2 of the second PMOS transistor M2 will be less or greater in absolute value than the threshold voltage of the second transistor M2. For example, the resistor R2 is here equal to 113 Ohms.

The control circuit also includes a first NMOS transistor M0 the gate G0 of which is connected to the drain D2 of the second transistor M2 and the source of which is connected to the cold power supply point GND by a fourth resistor R4. The drain Do of the first transistor M0 is connected to a node of the diode array located between two consecutive diodes, for example, the node ND4 located between the diodes D2 and D3.

Thus, the voltage Vgs0 between the gate G0 and the source S0 of the first transistor M0 is equal to the potential difference at the terminals of the fourth resistor R4. Depending on whether the transistor M2 is turned on or off and depending on the value of the resistor R4, a source gate voltage Vgs0 of the first NMOS transistor M0 will be less or greater in absolute value than the threshold voltage of the first transistor M0. For example, a resistor R4 is equal to 86000 Ohms.

Furthermore, the control circuit MC can optionally include first and third resistors R1 and R3.

The first resistor R1 is connected between the second resistor R2 and the first signal terminal E1.

In embodiments, the first resistor R1 has a terminal VR11 connected to the first signal terminal E1 and a terminal VR12 connected to the terminal VR21 of the second resistor R2. Moreover, the source S2 of the second transistor M2 is connected to the common node ND1 to the second resistor R2 and to the first resistor R1. The third resistor R3 is connected between the drain D2 of the second transistor M2 and the fourth resistor R4.

In embodiments, the third resistor R3 has a terminal VR31 connected to the drain D2 of the second transistor M2 and a terminal VR32 connected to the terminal VR41 of the fourth resistor R4. Moreover, the gate G0 of the first transistor M0 is connected to the common node ND2 to the fourth resistor R4 and to the third resistor R3.

The resistors R1 and R3, respectively, lower the voltage at the terminals of the resistor R2 and the voltage at the terminals of the resistor R4 thanks to a "divider bridge" type assembly. The values of the resistors R1 and R3 are chosen to maintain voltages Vgs0 and Vgs2 sufficiently low to protect the transistors M0 and M2, in particular for high voltage values V2 at the first signal terminal E1.

In embodiments, the resistor R1 is 48 Ohms and resistor R3 is 86000 Ohms.

The control circuit MC further includes a capacitor Cbs connected between the first signal terminal E1 and the gate G0 of the first transistor M0. The operation of the capacitor Cbs will be detailed later in the description in FIG. 4.

FIGS. 2 to 4 illustrate the integrated circuit IC described previously in relation to FIG. 1 for different voltage values present at the first signal terminal E1.

FIG. 2 illustrates the operation of the circuit IC when a voltage V5 less than the maximum voltage V1 that the domain DV can withstand is present at the first terminal E1.

In the presence of a voltage V5 on the first signal terminal E1, the resistors R1 and R2 cause a drop in potential, respectively, between the first signal terminal E1 and the common node ND1 and between the common node ND1 and the third signal terminal ND3. The voltage Vgs2 between the gate G2 and the source S2 of the second PMOS transistor M2 is less in absolute value than the threshold voltage of the second PMOS transistor M2. Consequently, the second transistor M2 remains in the off state and does not allow any current to flow between the source S2 and the drain D2.

The transistor M2 prevents current from flowing through the fourth and third resistors R4 and R3, and the potential difference at the terminals of the resistor R4 is, therefore, zero. The source gate voltage Vgs0 of the first transistor M0 is then less in absolute value than the threshold voltage of the first transistor M0. Consequently, the transistor M0 is in the off state and does not allow any current to flow between the drain Do and the source S0.

In other words, the first transistor M0 does not allow any current to flow between the node ND4 of the array of diodes located between the diodes D2 and D3 and the cold power supply point GND, and the diodes D3 and D4 are therefore not short-circuited by the first transistor M0.

The domain DV has a voltage V3 at the node ND3 lower than V1. More specifically, the voltage V3 is less than VTH0 and the diodes D1, D2, D3, and D4 of the diode array are therefore in the off state. However, it is known that a diode, even in the off state, is susceptible to leakage current due to its non-ideal features. The number N of diodes is chosen to limit the current leaks between the second signal terminal ND3 and the cold power supply point GND below a threshold, for example, 10 nA, during the operation of the domain DV.

For example, a too low number N of diodes will perhaps allow the normal operation of the domain DV but will not be able to sufficiently limit the leakage current and will then lead to an increase in the power consumption of the circuit IC. Thus, it is advantageous to use in this embodiment four diodes D1, D2, D3, and D4 to limit the current leaks between the third signal terminal ND3 and the cold power supply point GND below 10 nA.

FIG. 3 illustrates the circuit IC when a voltage V2 greater than the maximum voltage V1 that the domain DV can withstand is present at the first signal terminal E1.

In the presence of such a voltage V2, of 5.5 volts, for example, on the first signal terminal E1, the resistors R1 and R2 cause a drop in potential respectively between the first signal terminal E1 and the common node ND1 and between the common node ND1 and the third signal terminal ND3. It is possible to obtain a potential of 4.44 volts on the common node ND1 and a potential difference between the terminals of the resistor R2 of 2.36 volts.

The voltage Vgs2 between the gate and the source of the second PMOS transistor M2, of the same value as the potential difference at the terminals of the resistor R2, then becomes greater in absolute value than the threshold voltage of the second PMOS transistor M2. The transistor M2 then switches from the off state to the on state and a current can flow between the source S2 and the drain D2. A voltage of 4.44 volts is then present at the node ND5.

The current flowing between the first signal terminal E1 and the third signal terminal ND3 flows through the fourth and third resistors R4 and R3 by means of the second transistor M2, which has the effect of increasing the potential difference between the terminals of the resistors R3 and R4. A potential difference can be obtained between the terminals of the resistor R4 of 2.22 volts, corresponding to the potential on the common node ND2.

The voltage Vgs0 between the gate G0 and the source S0 of the first NMOS transistor M0, of the same value as the potential difference at the terminals of the resistor R4, becomes greater in absolute value than the threshold voltage of the first transistor M0.

The transistor M0 switches to the on state and the current at the node ND4 of the diode array located between the diodes D2 and D3 can flow between the drain D0 and the source S0 of the transistor M0, thus short-circuiting the diodes D3 and D4.

Consequently, the diodes D1 and D2 turn on and the domain DV has a voltage V3 between the third signal terminal ND3 and the cold power supply point GND equal to the sum of the effective threshold voltages VTH1 of the diodes D1 and D2 not short-circuited by the control circuit. It is thus possible to obtain a potential of 2.08 volts on the third signal terminal ND3, corresponding to the real value of the threshold voltage VTH1.

This voltage VTH1 is less than V1 (3.6 volts) and the domain DV is consequently protected.

The switching of the transistor M0 occurs only because of the presence of the voltage V2, which is located beyond a threshold defined according to the features of the control circuit such as the threshold voltages of the transistors M2 and M0 and the values of the resistors R1 to R4 previously determined by the person skilled in the art.

Therefore, the control circuit is configured to automatically and autonomously short-circuit the diodes D3 and D4 to limit the voltage on the third signal terminal ND3 to a value V3 less than the voltage V1, even in the absence of a power supply.

However, in some cases, it is possible to observe sudden variations in the voltage V2, in particular for high-frequency signals.

The voltage V2 can then exceed the voltage value V1 without the switching of the second transistor M2 having time to occur. The short-circuit mechanism is, therefore, no longer able to be triggered quickly enough to limit the voltage on the third signal terminal ND3 to a value V3 less than the voltage V1. The capacitor Cbs will overcome this, as illustrated in FIG. 4.

In the presence of a voltage V2, of 5.5 volts, for example, on the first signal terminal E1, the capacitor Cbs allows to apply the voltage V2 directly to the gate G0 of the first transistor M0, (regardless of the state of the second transistor M2) when the control circuit MC only include a resistor R4.

When the control circuit MC includes the third resistor R3, the capacitor Cbs allows the application of the voltage V2 on the common node ND5 to the transistor M2 and the resistor R3.

Taking into account the values of the resistors R3 and R4, in the presence of the voltage V2 on the common node ND5, a source gate voltage Vgs0 of the second NMOS transistor M0 is obtained, which is greater in absolute value than the threshold voltage of the second transistor M0. Therefore, this results in a switching of the transistor M0 to the on state and a short-circuit of the diodes D3 and D4.

However, the capacitor Cbs forms a low pass filter RC with the equivalent resistance of the resistors R1 and R2.

The values of the resistors R1 and R2, as well as the capacitance of the capacitor Cbs are therefore determined according to the frequency of the signal to be routed through the cell CEL so as not to restrict the transmission of high-frequency signals in operation. For a signal frequency of 12 MHz, it is possible to choose, for example, a capacitance of 2 pF and the values of the resistors R1 and R2 mentioned above.

The input/output cell CEL, therefore, protects the domain DV against overvoltages, even in the absence of a power supply, since it is the only overvoltage present at the first signal terminal E1 that will trigger the protection mechanism by short-circuiting a chosen number of diodes.

In the example which has been described, effective protection is obtained against overvoltages ranging from V1 (3.6 volts) to a voltage of 5.5 volts, even in the presence of a rapid voltage variation on the terminal E1, while maintaining correct operation for high-frequency signals.

The values of the various resistors, of the capacitor Cbs and the number of diodes to be short-circuited will be determined by the person skilled in the art when designing the cell CEL according to the voltage V1 and the overvoltage range for which protection is required.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An integrated circuit, comprising:
an input/output cell comprising:
a first signal terminal for receiving/transmitting a signal,
a third signal terminal coupled to a domain and configured to operate under a power supply voltage and capable of withstanding a maximum voltage greater than the power supply voltage, and
an array comprising N diodes coupled in series between the third signal terminal and a cold power supply point, N being an integer greater than 0, the array having an overall threshold voltage greater than the maximum voltage; and
a control circuit coupled between the first signal terminal and the array, the control circuit configured to, in a presence of a second voltage on the first signal terminal greater than the maximum voltage, automatically and autonomously short-circuit at least one diode in the array to limit a voltage on the third signal terminal to a third voltage less than the maximum voltage, the control circuit comprising:
a second resistor coupled between the first signal terminal and the third signal terminal,
a first transistor, a drain terminal of the first transistor coupled to a node of the array located between two consecutive diodes, a source terminal of the first transistor coupled to the cold power supply point,
a second transistor, a source terminal of the second transistor coupled to the second resistor, a gate terminal of the second transistor coupled to the third signal terminal, and a drain terminal of the second transistor coupled to the gate terminal of the first transistor.

2. The integrated circuit of claim 1, wherein a value of N is chosen to limit current leaks between a second signal terminal and the cold power supply point below a threshold during operation of the domain.

3. The integrated circuit of claim 1, wherein the control circuit further comprises a first resistor coupled between the second resistor and the first signal terminal, the source terminal of the second transistor coupled to a node common to the first resistor and the second resistor.

4. The integrated circuit of claim 3, wherein the control circuit further comprises a third resistor and a fourth resistor, the third resistor coupled between the drain terminal of the second transistor and the fourth resistor, the gate terminal of the first transistor coupled to a node common to the third resistor and the fourth resistor.

5. The integrated circuit of claim 1, wherein the input/output cell further comprises a capacitor coupled between the first signal terminal and the gate terminal of the first transistor.

6. The integrated circuit of claim 1, wherein the second transistor is a P channel metal oxide semiconductor (PMOS) transistor, and wherein the first transistor is an N channel metal oxide semiconductor (NMOS) transistor.

7. The integrated circuit of claim 1, wherein the array comprises four diodes and the overall threshold voltage is approximately 4.4 volts, and wherein the control circuit is configured to short-circuit two of the four diodes when the second voltage exceeds the maximum voltage.

8. A method, comprising:
having an integrated circuit comprising an input/output cell and a control circuit, the input/output cell comprising a first signal terminal and a third signal terminal coupled to a domain, the first signal terminal used to receive or transmit a signal, the third signal terminal operating under a power supply voltage and capable of withstanding a maximum voltage greater than the power supply voltage, the input/output cell further comprising an array comprising of N diodes coupled in series between the third signal terminal and a cold power supply point, N being an integer greater than 0, the array having an overall threshold voltage greater than the maximum voltage, the control circuit coupled between the first signal terminal and the array; and
automatically and autonomously short circuiting, by the control circuit, at least one diode in the array to limit a voltage on the third signal terminal to a third voltage less than the maximum voltage in a presence of a second voltage on the first signal terminal greater than the maximum voltage,
wherein the control circuit comprises:
a second resistor coupled between the first signal terminal and the third signal terminal,
a first transistor, a drain terminal of the first transistor coupled to a node of the array located between two consecutive diodes, a source terminal of the first transistor coupled to the cold power supply point,
a second transistor, a source terminal of the second transistor coupled to the second resistor, a gate terminal of the second transistor coupled to the third signal terminal, and a drain terminal of the second transistor coupled to the gate terminal of the first transistor.

9. The method of claim 8, wherein a value of N is chosen to limit current leaks between the third signal terminal and the cold power supply point below a threshold during operation of the domain.

10. The method of claim 9, wherein the control circuit further comprises a first resistor coupled between the second resistor and the first signal terminal, the source terminal of the second transistor coupled to a node common to the first resistor and the second resistor.

11. The method of claim 10, wherein the control circuit further comprises a third resistor and a fourth resistor, the third resistor coupled between the drain terminal of the second transistor and the fourth resistor, the gate terminal of the first transistor coupled to a node common to the third resistor and the fourth resistor.

12. The method of claim 9, wherein the input/output cell further comprises a capacitor coupled between the first signal terminal and the gate terminal of the first transistor.

13. The method of claim 9, wherein the second transistor is a P channel metal oxide semiconductor (PMOS) transistor, and wherein the first transistor is an N channel metal oxide semiconductor (NMOS) transistor.

14. The method of claim 8, wherein the array comprises four diodes and the overall threshold voltage is approximately 4.4 volts, and wherein the control circuit is configured to short-circuit two of the four diodes when the second voltage exceeds the maximum voltage.

15. An electronic device comprising an integrated circuit, the integrated circuit comprising:
an input/output cell comprising:
a first signal terminal for receiving/transmitting a signal,
a third signal terminal coupled to a domain and configured to operate under a power supply voltage and capable of withstanding a maximum voltage greater than the power supply voltage, and
an array comprising N diodes coupled in series between the third signal terminal and a cold power supply point, N being an integer greater than 0, the array having an overall threshold voltage greater than the maximum voltage; and
a control circuit coupled between the first signal terminal and the array, the control circuit configured to, in a presence of a second voltage on the first signal terminal greater than the maximum voltage, automatically and autonomously short-circuit at least one diode in the array to limit a voltage on the third signal terminal to a third voltage less than the maximum voltage,
wherein the control circuit comprises:
a second resistor coupled between the first signal terminal and the third signal terminal,
a first transistor, a drain terminal of the first transistor coupled to a node of the array located between two consecutive diodes, a source terminal of the first transistor coupled to the cold power supply point,
a second transistor, a source terminal of the second transistor coupled to the second resistor, a gate terminal of the second transistor coupled to the third signal terminal, and a drain terminal of the second transistor coupled to the gate terminal of the first transistor.

16. The electronic device of claim 15, wherein a value of N is chosen to limit current leaks between the third signal terminal and the cold power supply point below a threshold during operation of the domain.

17. The electronic device of claim 15, wherein the control circuit further comprises:
a first resistor coupled between the second resistor and the first signal terminal, a source terminal of the second transistor coupled to a node common to the first resistor and the second resistor;
a third resistor; and
a fourth resistor, the third resistor coupled between the drain terminal of the second transistor and the fourth resistor, the gate terminal of the first transistor coupled to a node common to the third resistor and the fourth resistor.

18. The electronic device of claim 15, wherein the input/output cell further comprises a capacitor coupled between the first signal terminal and the gate terminal of the first transistor.

19. The electronic device of claim 15, wherein the second transistor is a P channel metal oxide semiconductor (PMOS) transistor, and wherein the first transistor is an N channel metal oxide semiconductor (NMOS) transistor.

20. The electronic device of claim 15, wherein the array comprises four diodes and the overall threshold voltage is approximately 4.4 volts, and wherein the control circuit is configured to short-circuit two of the four diodes when the second voltage exceeds the maximum voltage.

* * * * *